United States Patent
Duan et al.

(10) Patent No.: US 11,619,703 B2
(45) Date of Patent: Apr. 4, 2023

(54) METHOD AND SYSTEM TO SELECT A PROCESS FOR ESTIMATING THE LOCATION OF A RADIO DEVICE

(71) Applicant: Red Point Positioning Corporation, Boston, MA (US)

(72) Inventors: Chunjie Duan, Brookline, MA (US); Georgiy Pekhteryev, Kharkov (UA); Mingda Zhou, Stoneham, MA (US)

(73) Assignee: Red Point Positioning Corporation, Boston, MA (US)

( * ) Notice: Subject to any disclaimer, the term of this patent is extended or adjusted under 35 U.S.C. 154(b) by 0 days.

(21) Appl. No.: 17/109,586

(22) Filed: Dec. 2, 2020

(65) Prior Publication Data
US 2022/0171012 A1 Jun. 2, 2022

(51) Int. Cl.
*G01S 5/02* (2010.01)
*G06N 20/00* (2019.01)
*H04W 4/02* (2018.01)
*H04W 64/00* (2009.01)

(52) U.S. Cl.
CPC .......... *G01S 5/0284* (2013.01); *G01S 5/0257* (2013.01); *G06N 20/00* (2019.01); *H04W 4/025* (2013.01); *H04W 64/003* (2013.01)

(58) Field of Classification Search
CPC ..... G01S 5/0284; G01S 5/0257; G06N 20/00; H04W 4/025; H04W 64/003
See application file for complete search history.

(56) References Cited

U.S. PATENT DOCUMENTS

| | | | | |
|---|---|---|---|---|
| 2010/0227626 | A1* | 9/2010 | Dressler | G01S 5/0236 455/456.1 |
| 2014/0162696 | A1* | 6/2014 | Tysowski | G01S 19/48 455/456.3 |
| 2015/0119071 | A1* | 4/2015 | Basha | G01S 5/0231 455/456.1 |

FOREIGN PATENT DOCUMENTS

| | | | | |
|---|---|---|---|---|
| CN | 110926461 | A * | 3/2020 | G01C 21/165 |
| CN | 111220946 | A | 6/2020 | |
| KR | 20190108373 | A | 9/2019 | |

OTHER PUBLICATIONS

"International Search Report and Written Opinion", PCT/US2021/061168, dated Mar. 14, 2022, 8 pages.
"Amendment Under Article 34 / Response to Written Opinion", dated Jul. 18, 2022, 15 pgs.

* cited by examiner

*Primary Examiner* — Umair Ahsan
(74) *Attorney, Agent, or Firm* — Guntin & Gust, PLC; Kenneth Kwan

(57) ABSTRACT

Aspects of the subject disclosure may include, for example, selecting, according to selection information wirelessly transmitted from one or more anchors, a particular position estimation mode from among a group of position estimation modes that are each associated with a different radio measurement locating process. One or more radio measurements can be obtained from at least one of the one or more anchors and position information can be determined for the mobile device based on the one or more radio measurements by applying a particular radio measurement locating process of the particular position estimation mode. Other embodiments are disclosed.

20 Claims, 14 Drawing Sheets

500

700

800

1000

METHOD AND SYSTEM TO SELECT A PROCESS FOR ESTIMATING THE LOCATION OF A RADIO DEVICE

FIELD OF THE DISCLOSURE

The subject disclosure relates to a method and system for selecting a process for estimating the location of a radio device.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, trajectory of objects, speed of objects, positions of objects, or combinations thereof.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining location information for mobile devices utilizing anchors and a position estimation engine or component that can select among different processes to perform the estimation. In one or more embodiments, transmitted messages (e.g., broadcast by one or more anchors) received by mobile devices can include selection information that enables the mobile device to select a particular position estimation mode from among a group of position estimation modes where the different modes can correspond to different processes for position estimation. The selection of a particular position estimation mode can be based on various factors including anchor identification and/or available anchor pairs from which to obtain radio measurements. Other information can also be utilized in the selection process, such as previously determined position estimation modes, previously determined position information, and so forth. In one or more embodiments, a real time location system is provided which utilizes instantaneous radio measurements of messages communicated in the system for location determination, such as systems and functions described with respect to FIGS. 1-11, as well as described in other embodiments herein. Other embodiments are described in the subject disclosure.

Figure 1:
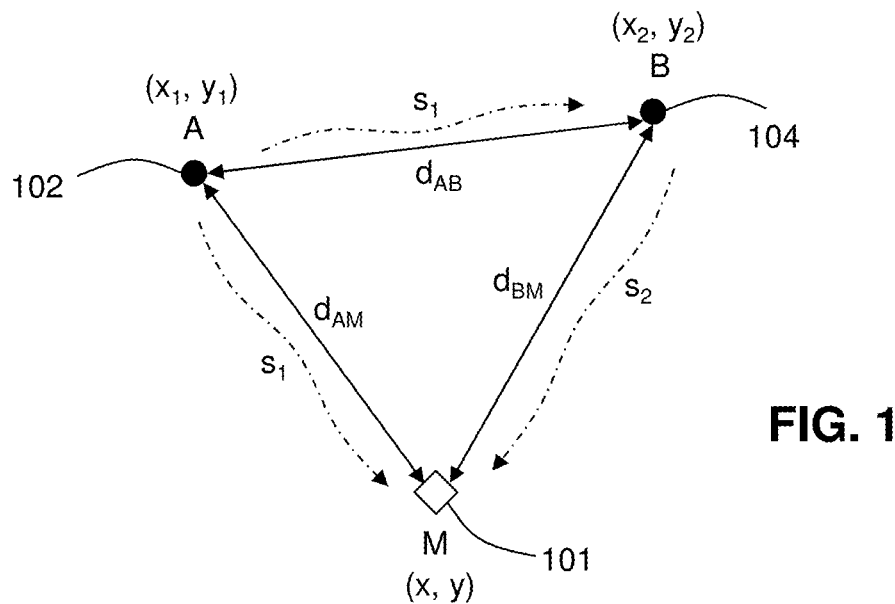
FIG. 1 is a block diagram illustrating an exemplary, non-limiting embodiment of a mobile tag and anchors for determining location information between the mobile tag and the anchors in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In one or more embodiments, the devices and functions described with respect to FIG. 1, which can include messaging for performing location determination, can also be utilized in selecting a particular position estimation mode (e.g., a particular process) to be implemented in estimating a position.

Figure 2:
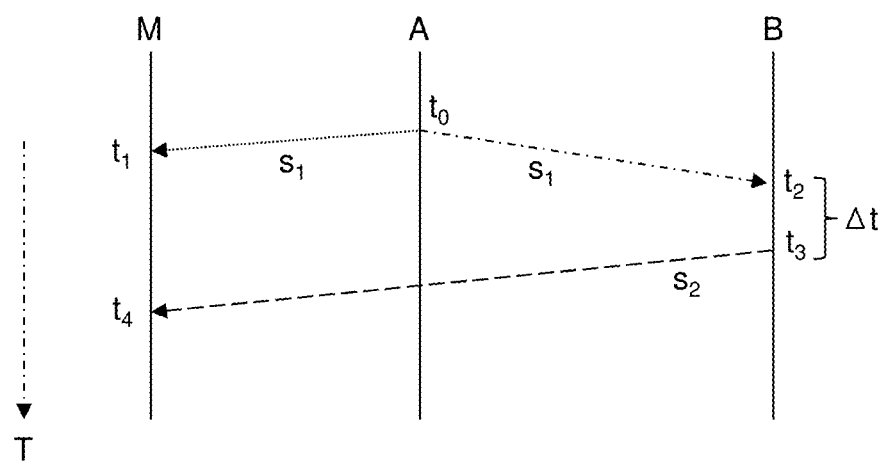
FIG. 2 is a block diagram illustrating an exemplary, non-limiting embodiment of a timing diagram for determining location information between the mobile tag and the anchors of FIG. 1 in accordance with various aspects described herein.

In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time $t_0$, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t = t_3 - t_2$), or can receive this information in the second wireless signal ($s_2$) transmitted by anchor 104. The equations that follow can be used to calculate a first possible location of the mobile tag 101 relative to anchor pairs 102, 104.

The distance between anchor 102 and the mobile tag can be represented as, $$d_{AM} = c(t_1 - t_0) \quad \text{(EQ 1)},$$

where c is the speed of light constant. Similarly, the distance from anchor 102 to anchor 104 can be represented as, $$d_{AB} = c(t_2 - t_0) \quad \text{(EQ 2)}.$$

Additionally, the distance from anchor 104 to the mobile tag 101 can be represented as, $$d_{BM} = c(t_4 - t_3) \quad \text{(EQ 3)}.$$

The total distance traveled by the first wireless signal ($s_1$) from anchor 102 to anchor 104 and the second wireless signals ($s_2$) from anchor 104 to mobile tag 101 can be represented as, $$d_{AB} + d_{BM} = c(t_2 - t_0 + t_4 - t_3) \quad \text{(EQ 4A)}.$$

To eliminate variable $t_0$, equation EQ 1 can be subtracted from equation EQ 4A, resulting in, $$d_{AB} + d_{BM} - d_{AM} = c(t_2 - t_1 + t_4 - t_3) \quad \text{(EQ 4B)}.$$

Substituting $\Delta t = t_3 - t_2$ into EQ 4B results in equation, $$d_{AB} + d_{BM} - d_{AM} = c(t_4 - t_1 - \Delta t) \quad \text{(EQ 4C)}.$$

Since $d_{AB}$ is a constant known to the mobile tag 101 and the time variables of the factor $c(t_4 - t_1 - \Delta t)$ are also known to the mobile tag 101, EQ 4C can be rewritten as, $$d_{BM} - d_{AM} = \Delta d_1 \quad \text{(EQ 5)},$$

where $\Delta d_1 = c(t_4 - t_1 - \Delta t) - d_{AB}$, which are constants known to mobile tag 101. Furthermore, in an example of two-dimensional (2D) space, the distance between anchor 102 and the mobile tag 101 can be represented as, $$d_{AM} = \sqrt{(x-x_1)^2 + (y-y_1)^2},$$

and the distance between anchor 104 and the mobile tag 101 can be represented as, $$d_{BM} = \sqrt{(x-x_2)^2 + (y-y_2)^2}.$$

Substituting $d_{AM}$ and $d_{BM}$ in EQ 5 results in the following equation, $$\sqrt{(x-x_2)^2 + (y-y_2)^2} - \sqrt{(x-x_1)^2 + (y-y_1)^2} = \Delta d_1 \quad \text{(EQ 6)}.$$

Figure 3:
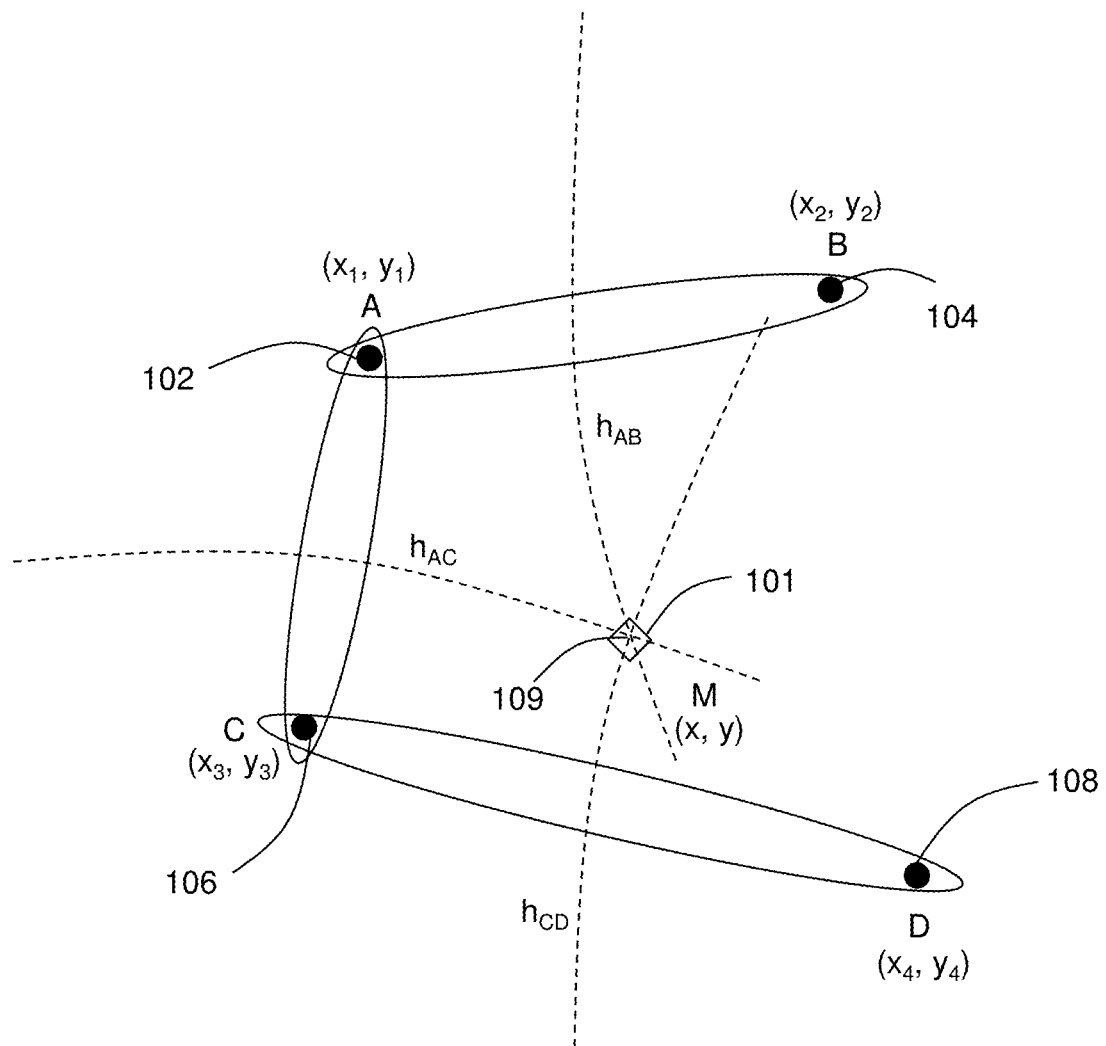
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors pairs 102, 104. Such a hyperbolic curve can be represented as, $$h_{AB} = \Delta d_1 \quad \text{(EQ 7A)},$$

where $h_{AB} = \sqrt{(x-x_1)^2 + (y-y_1)^2} - \sqrt{(x-x_1)^2 + (y-y_1)^2}$. The mobile tag 101 can be further configured to perform the above calculation across other anchor pairs as depicted in FIG. 3. In one or more embodiments, the devices and functions described with respect to FIG. 3, which can include messaging for performing location determination, can also be utilized in selecting a particular position estimation mode (e.g., a particular process) to be implemented in estimating a position. In one embodiment, the mobile tag 101 can be configured to determine a hyperbolic curve between anchors 102 and 106 (i.e., anchors A and C) resulting in equation, $$h_{AC} = \Delta d_2 \quad \text{(EQ 7B)},$$

where $\Delta d_2$ is a constant known to mobile tag 101, and where $h_{AC} = \sqrt{(x-x_3)^2 + (y-y_3)^2} - \sqrt{(x-x_1)^2 + (y-y_1)^2}$. Additionally, the mobile tag 101 can be configured to determine a hyperbolic curve between anchors 106 and 108 (i.e., anchors C and D) resulting in equation, $$h_{CD} = \Delta d_3 \quad \text{(EQ 7C)},$$

where $\Delta d_3$ is a constant known to mobile tag 101, and where $h_{CD} = \sqrt{(x-x_4)^2 + (y-y_4)^2} - \sqrt{(x-x_3)^2 + (y-y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to anchors pairs 102 and 104 (anchors A/B), 106 and 108 (anchors A/C), 106 and 108 (anchors C/D). It will be appreciated that the mobile tag 101 can also be configured to determine a three-dimensional coordinate (i.e., x, y, z) of its location in a number of different ways including by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchors 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
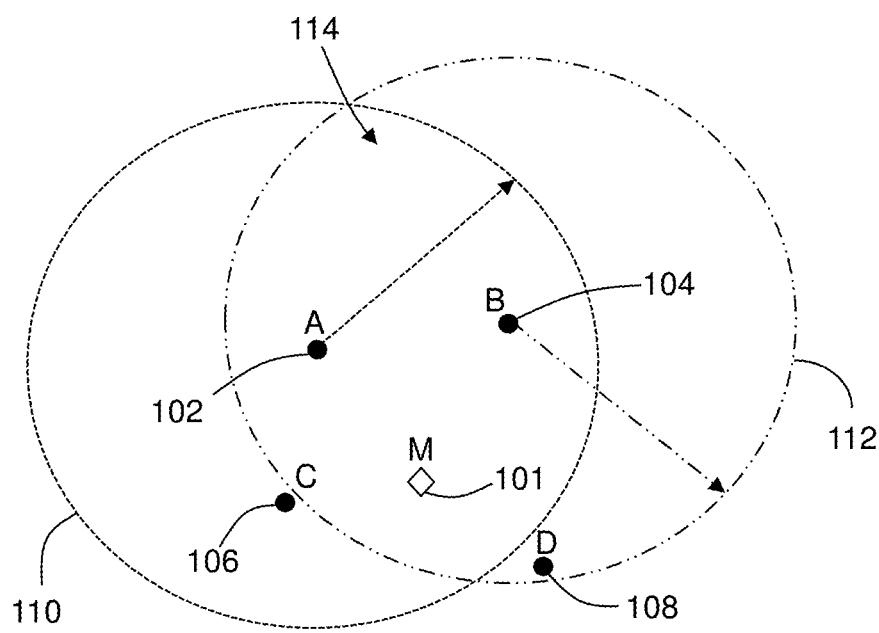
FIGS. 4A, 4B and 4C are block diagrams illustrating exemplary, non-limiting embodiments for selecting pairs of anchors in accordance with various aspects described herein.
Figure 4B:
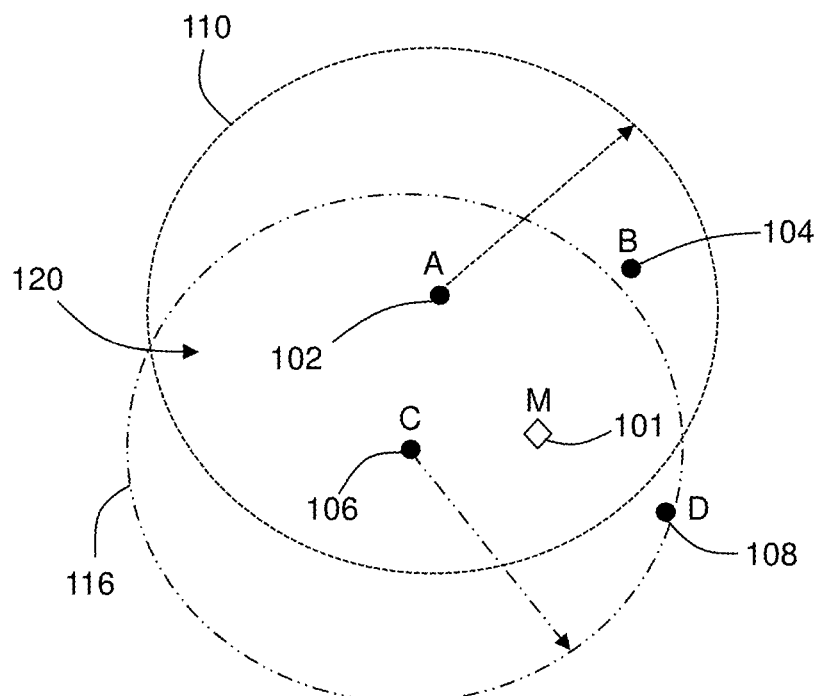
Figure 4C:
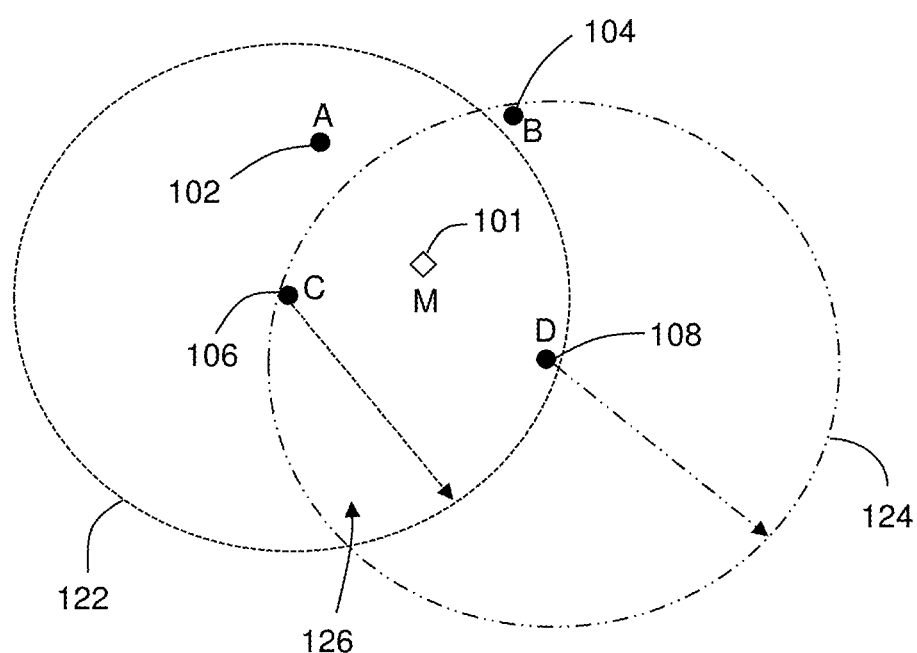

FIG. 4B shows that the coverage areas 110 and 116 of anchor pairs 102, 106 (anchors A/C), respectively, creates an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pairs 106, 108 (anchors C/D), respectively, creates an overlapping region 126 that encompasses anchors 106 and 108 and the mobile tag 101, thereby enabling the mobile tag 101 to calculate hyperbolic curve $h_{CD}$.

Figure 5:
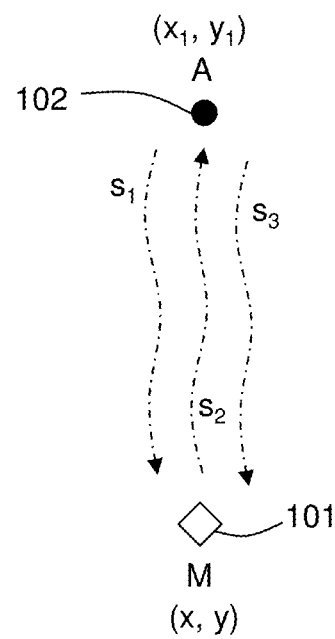
FIG. 5 is a block diagram illustrating an exemplary, non-limiting embodiment of a mobile tag and an anchor for determining location information between the mobile tag and the anchor in accordance with various aspects described herein.
Figure 6:
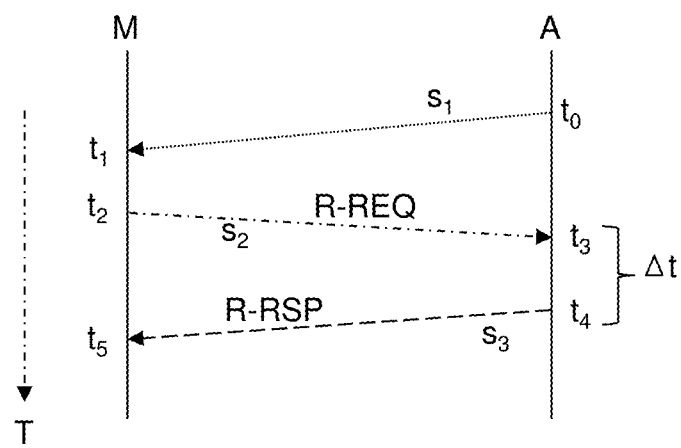
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In one or more embodiments, the devices and functions described with respect to FIG. 5, which can include messaging for performing location determination, can also be utilized in selecting a particular position estimation mode (e.g., a particular process) to be implemented in estimating a position.

In the embodiment of FIG. 5, the mobile tag 101 can be configured to use a two-way time of arrival (TW-TOA) process for determining a distance between itself and the anchor 102. Optionally, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r\text{-}trip} = d_{AM} + d_{MA},$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2).$$

Similarly, the distance from anchor 102 to the mobile tag 101 can be determined by, $$d_{AM} = c(t_5 - t_4).$$

With the above equations, the roundtrip distance can be rewritten as, $$d_{r\text{-}trip} = c(t_5 - t_4 + t_3 - t_2).$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t).$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA} = d_{r\text{-}trip}/2.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other. It will be appreciated that TW-TOA process described above can also between mobile tags 101. That is, anchor 102 shown in FIG. 5 can be replaced with another mobile tag 101. In this embodiment, mobile tags 101 can use TW-TOA to measure a distance between each other.

It will be appreciated that the TDOA and TW-TOA processes described above can also between mobile tags 101. For example, FIGS. 1-3, 4A-4C, and 5-6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
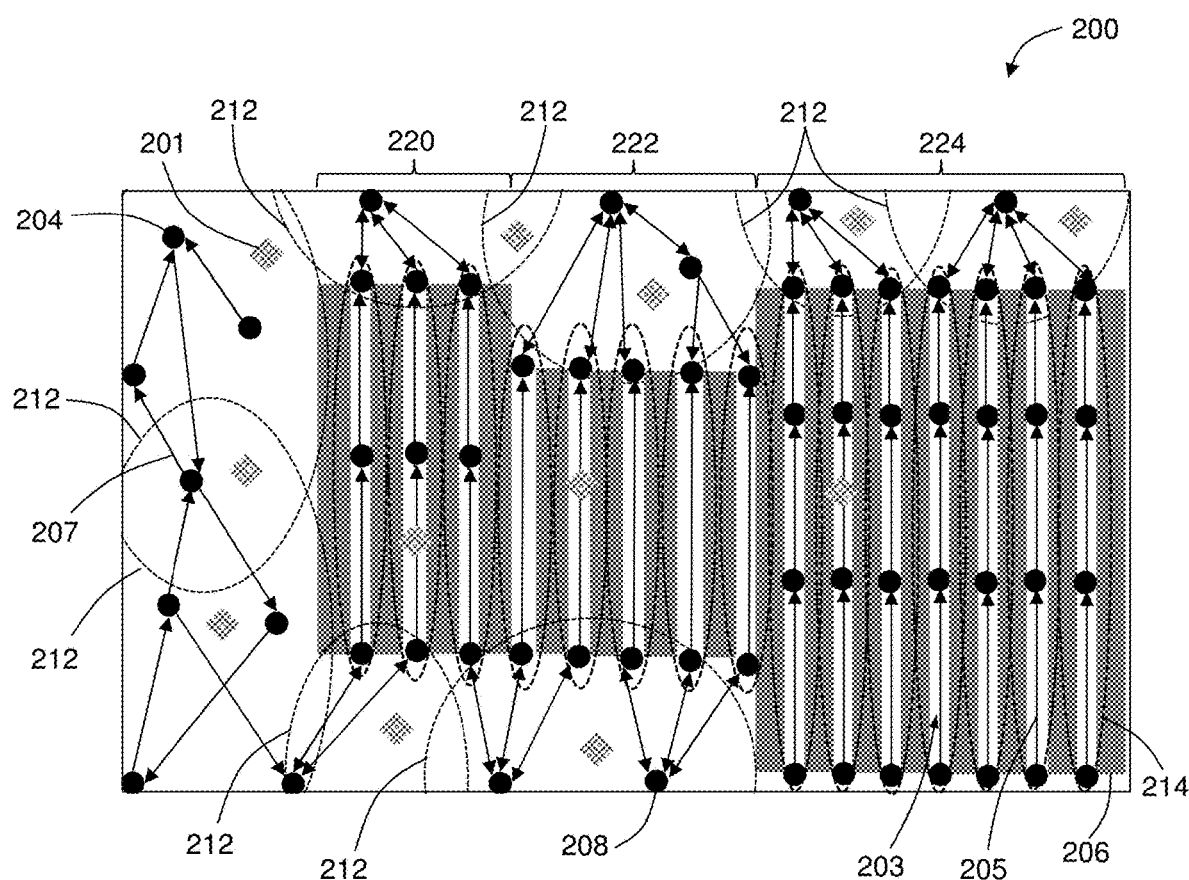
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7. In one or more embodiments, the devices and functions described with respect to FIG. 7, which can include messaging for performing location determination, can also be utilized in selecting a particular position estimation mode (e.g., a particular process) to be implemented in estimating a position.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure can be applied to. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 can be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
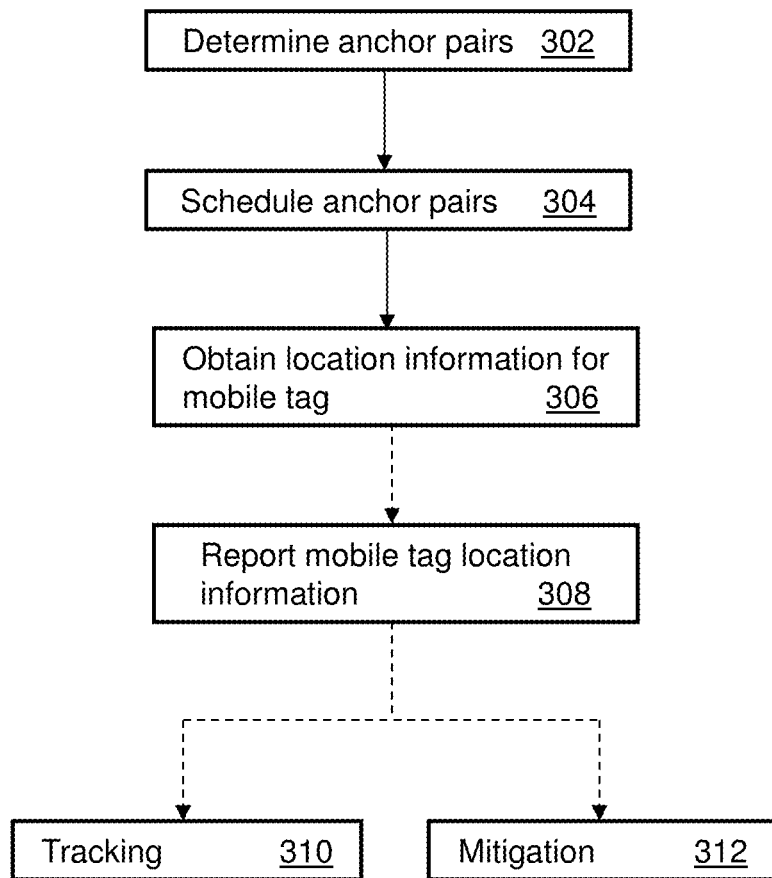
FIG. 8 depicts an illustrative embodiment of a method for determining location information and uses thereof in accordance with various aspects described herein.

FIG. 8 depicts an illustrative embodiment of a method 300 in accordance with various aspects described herein. In one or more embodiments, the devices and functions described with respect to FIG. 8, which can include messaging for performing location determination, can also be utilized in selecting a particular position estimation mode (e.g., a particular process) to be implemented in estimating a position. Method 300 can begin at step 302 where a computing system such as a server (described below in relation to FIG. 11) is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that other techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
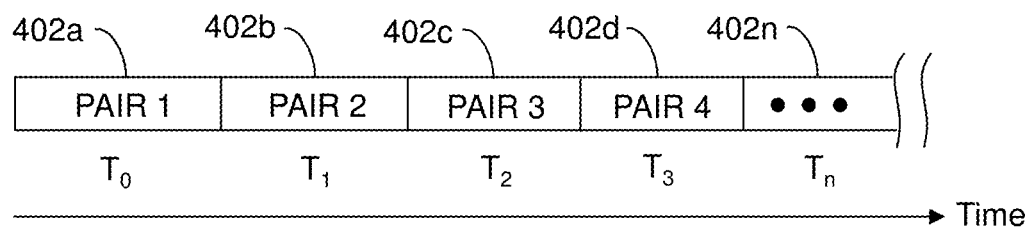
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$–$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 204 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($s_1$) an indication whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the lookup-table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
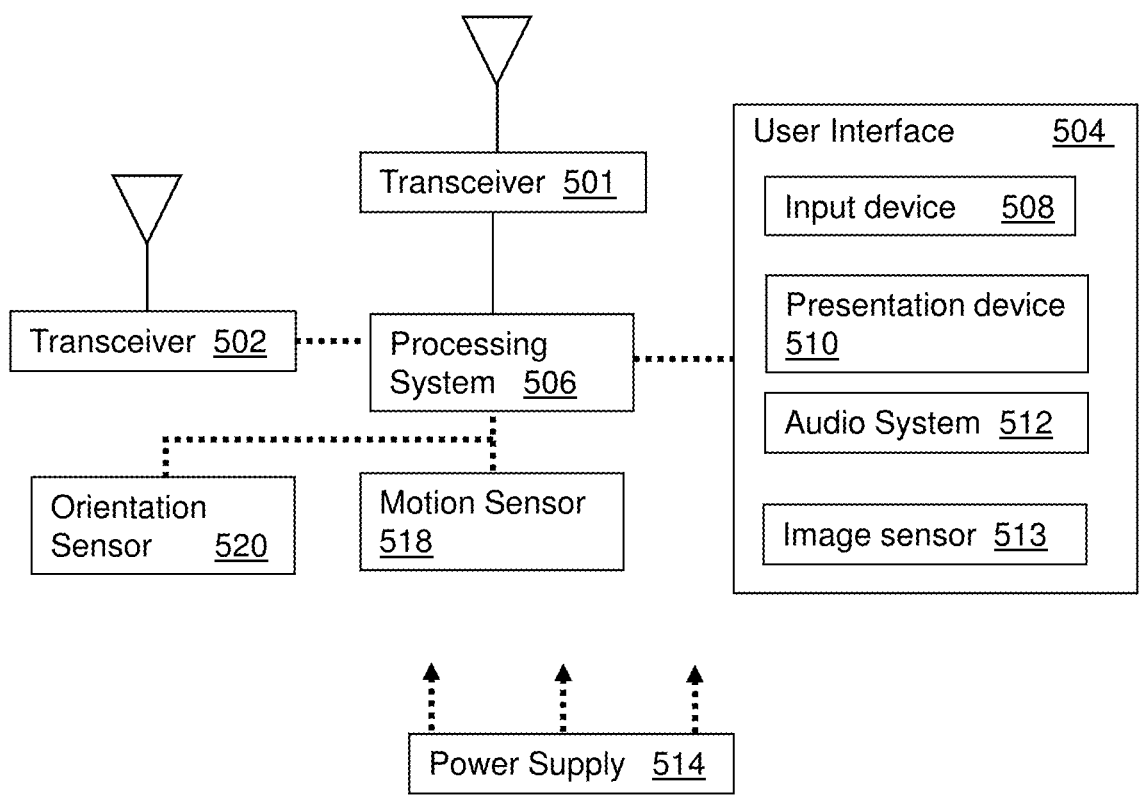
FIG. 10 is a block diagram of an example, non-limiting embodiments of a communication device in accordance with various aspects described herein.

FIG. 10 is a block diagram of an example, non-limiting embodiments of a communication device 500 in accordance with various aspects described herein. Communication device 500 can serve in whole or in part as an illustrative embodiment of a mobile tag 101 and an anchor 102, 104, 106, 108, 204 as depicted in FIGS. 1-7, and can be configured to perform portions of method 300 of FIG. 8. In one or more embodiments, the devices and functions described with respect to FIG. 10, which can include messaging for performing location determination, can also be utilized in selecting a particular position estimation mode (e.g., a particular process) to be implemented in estimating a position.

In an embodiment, communication device 500 can comprise a first wireless transceivers 501, a user interface (UI) 504, a power supply 514, and a processing system 506 for managing operations of the communication device 500. In another embodiment, communication device 500 can further include a second wireless transceiver 502, a motion sensor 518, and an orientation sensor 520. The first wireless transceiver 501 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 502 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 502 can be utilized to conserve power and offload messaging between communication devices by utilizing narrow band signals such as Bluetooth®, ZigBee®, or WiFi, instead of ultra-wideband signals. One or both wireless transceivers 501, 502 can also be used for obtaining a strength indicator (RSSI). One or both wireless transceivers 501, 502 can also be equipped with multiple antennas and one or more phase detectors to determine angle of arrival of wireless signals and thereby an orientation of the communication device 500 (e.g., mobile tag 101) relative to another communication device 500 (e.g., anchor 204).

The UI 504 can include an input device 508 that provides at least one of one or more depressible buttons, a tactile keypad, a touch-sensitive keypad, or a navigation mechanism such as a roller ball, a joystick, or a navigation disk for manipulating operations of the communication device 500. The input device 508 can be an integral part of a housing assembly of the communication device 500 or an independent device operably coupled thereto by a tethered wireline interface (such as a USB cable) or a wireless interface supporting for example Bluetooth®. The UI 504 can further include a presentation device 510. The presentation device 510 can include a vibrator to generate haptic feedback, an LED (Light Emitting Diode) configurable by the processing system 506 to emit one or more colors, and/or a monochrome or color LCD (Liquid Crystal Display) or OLED (Organic LED) display configurable by the processing system to present alphanumeric characters, icons or other displayable objects.

The UI 504 can also include an audio system 512 that utilizes audio technology for conveying low volume audio (for proximity listening by a user) and/or high volume audio (for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images in a vicinity of the communication device 500. The camera can be used for performing facial recognition and user ID recognition that can be combined with embodiments of the subject disclosure.

The power supply 514 can utilize common power management technologies such as replaceable and rechargeable batteries, supply regulation technologies, and/or charging system technologies for supplying energy to the components of the communication device 500 to facilitate portable applications. Alternatively, or in combination, the charging system can utilize external power sources such as DC power supplied over a physical interface such as a USB port or other suitable tethering technologies.

The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (in degrees, minutes, or other suitable orientation metrics). In some embodiments, the orientation sensor 520 can replace a need for utilizing multiple antennas with the first and/or second wireless transceivers 501, 502 and a phase detector for performing angle of arrival measurements. In other embodiments, the function of the orientation sensor 520 can be combined with an angle of arrival measurement performed with multiple antennas with the first and/or second wireless transceivers 501, 502 and a phase detector.

The processing system 506 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 10 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings.

The communication device 500 as described herein can operate with more or less of the circuit components shown in FIG. 10. These variant embodiments can be used in one or more embodiments of the subject disclosure.

Figure 11:
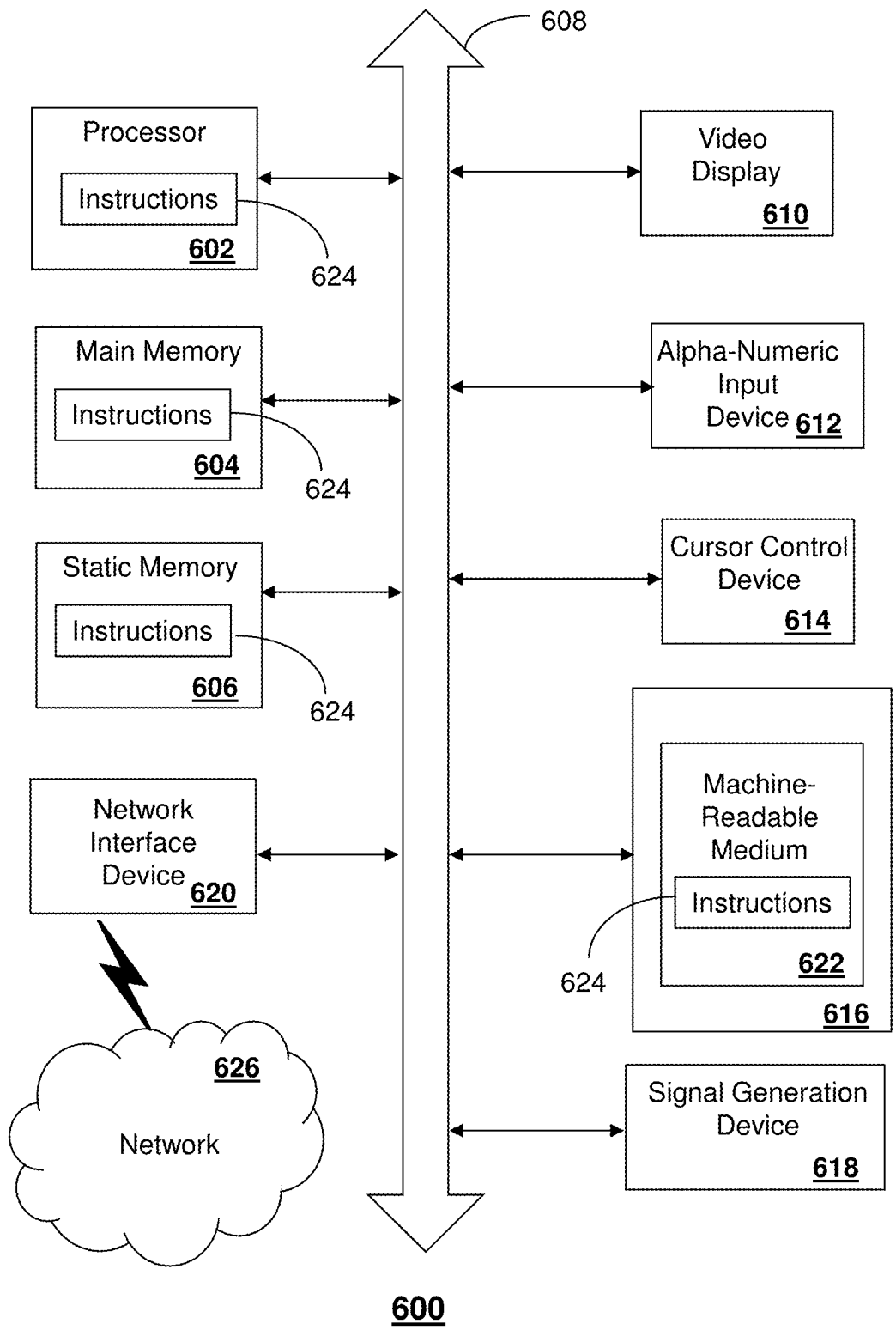
FIG. 11 is a block diagram of an example, non-limiting embodiments of a computing system in accordance with various aspects described herein.

FIG. 11 depicts an exemplary diagrammatic representation of a machine in the form of a computing system 600 within which a set of instructions, when executed, may cause the machine to perform any one or more of the methods described above. One or more instances of the machine can operate, for example, as the computing system referred to in method 300 of FIG. 8. In one or more embodiments, the components and functions described with respect to FIG. 11, which can include messaging for performing location determination, can also be utilized in selecting a particular position estimation mode (e.g., a particular process) to be implemented in estimating a position. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

In one or more embodiments, a location system (e.g., a real-time locating system) can rely on a wireless network infrastructure formed by anchors to provide real-time positioning services to tags or other mobile devices in a coverage area of the network. In one or more embodiments, a position engine or position estimation engine (e.g., located in tags or mobile devices), can calculate the position of the tags or mobile devices based on the information provided by the wireless network infrastructure. In one or more embodiment, the real-time locating system can be subject to, or otherwise involved in, a variety of use cases, for which there may be a preferable radio measurement locating process (or processes) for various reasons including desired accuracy (e.g., due to the area layout, types of mobile devices, types of wireless communication being utilized, and so forth). In one or more embodiments, different modes of the position estimation can be provided which are selectable (e.g., by the mobile device) and which correspond to different radio measurement locating processes. In one embodiment, by switching among different modes in an appropriate manner, the position engine can seamlessly and accurately calculate the position of tags or mobile devices, including during transitioning from one area to another area.

Figure 12:
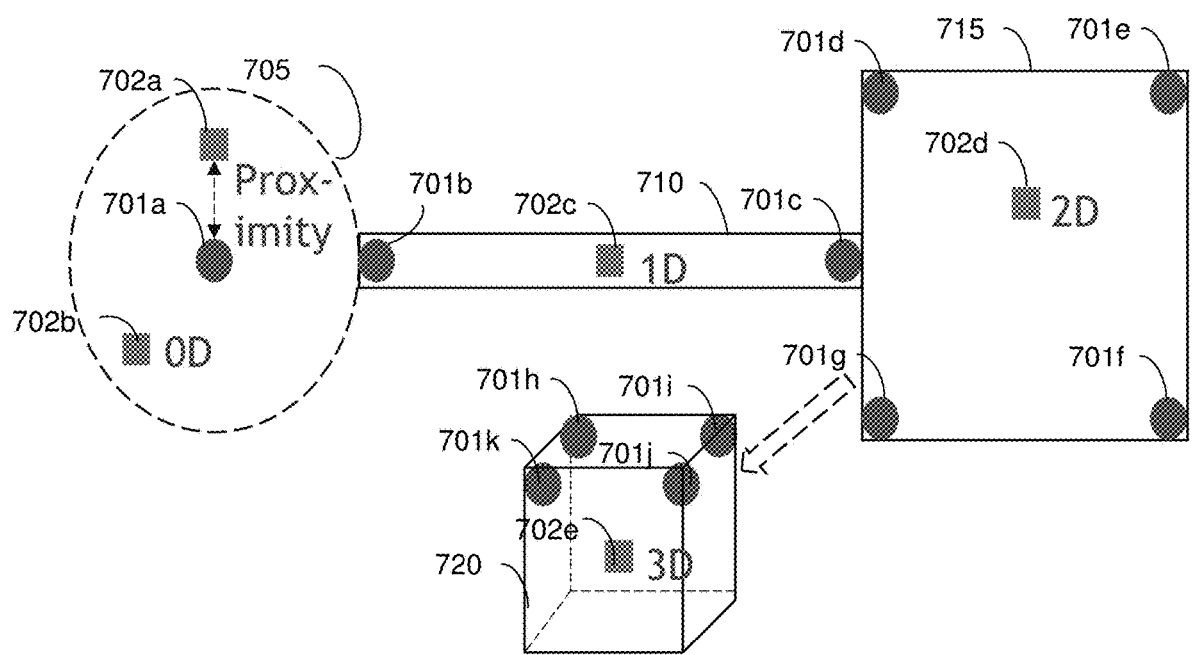
FIGS. 12-13 are block diagrams illustrating exemplary, non-limiting embodiments for selecting modes and determining location information for mobile devices in accordance with various aspects described herein.

FIG. 12 is a block diagram of a portion of a system 700 illustrating an exemplary, non-limiting embodiment of mobile devices 702 (labeled a-e) and stationary anchors 701 (labeled a-k) for selecting a particular radio measurement locating process(es) from among a group of processes and for determining location information for the mobile devices 702 utilizing the stationary anchors 701 in accordance with various aspects described herein. System 700 shows four areas 705, 710, 715, 720 of a demarcated area where the four areas have eleven anchors 701 that facilitate determining the position of the mobile devices 702, although any number of areas and/or any number of anchors in various configurations and layouts can be utilized, such as shown in FIG. 7, for enabling position or location estimation for any number of mobile devices (which can be of various types).

As an example, area 710 can be a hallway where the anchors 701*b-c* are positioned near the ends of the hallway. As another example, area 715 can be a room where the anchors 701*d-g* are positioned near the corners of the room. As another example, area 720 can be a room where the anchors 701*h-k* are positioned near the ceiling corners or wall corners of the room. The area 705 is illustrated as an open space, area 710 is illustrated as a hallway, area 715 is illustrated as a room, and area 720 is illustrated as a room or warehouse space. The areas 705, 710, 715, 720 can be any types of structures (e.g., office, house, apartment building, factory floor, warehouse, tunnel) and/or can be indoors and/or outdoors (e.g., parking lot, outside of airport terminals, stadium, bridge, open space, and so forth).

Any number of anchors can be utilized in any of the areas, in order to facilitate device or object location determinations in a demarcated area that is serviced by the anchors. The positioning of the anchors can also vary, such as depending upon the dimensions and/or shapes of the particular area(s). For example, a long hallway could have one or more anchors positioned between the anchors 701*b-c* that are near the ends of the hallway. As another example, a large room could have one or more anchors positioned inwards from the corners of the room. The particular number and configuration (e.g., positioning) of the anchors 701 can be selected based on various factors including the area layout, indoor vs outdoor space, objects and structures in the area, the available radio measurement locating processes that can be employed, the type of wireless communication(s) that are to be utilized in the locating processes (or that are utilized in the area), radio noise and interference considerations, accuracy thresholds and targets for position estimation, types of mobile objects whose locations are being determined, types of anchors being employed, and so forth.

The anchors 701 can be various types of stationary devices that are capable of wireless communication and whose position information is known (e.g., X, Y, and/or Z coordinates, distance between anchors and height difference between anchors). For example, the anchors 701 can be one or more of the anchors as described herein with respect to FIGS. 1-11. Although, other types of anchors can also be utilized. The mobile devices 702 can be various types of mobile devices (e.g., the same type or different types) that are capable of wireless communication, such as a mobile tag, personnel ID card, mobile phone, equipment radio, vehicle radio, and so forth. The mobile devices 702 can be one or more of the mobile tags or mobile objects as described herein with respect to FIGS. 1-11.

In one or more embodiments, system 700 enables a selection of a radio measurement locating process from among a group of such processes so that the selected process can be employed for determining location information between one of mobile devices 702 and one or more of the stationary anchors 701. In one or more embodiments, the selection of the particular process, referred to herein as a selection of a position estimation mode, can be done by the mobile device 702 according to various information, including information received from one or more of the anchors 701, information stored locally by the mobile device, and/or information stored remotely such as in a server or other device that is accessible to the mobile device. In one embodiment, the selection can be based on utilizing the radio measurement locating process (corresponding to a position estimation mode) that provides the most accuracy. In another embodiment, the selection can be based on utilizing the radio measurement locating process (corresponding to a position estimation mode) which is assigned to a particular area or type of area (e.g., hallway vs office vs open space). In another embodiment, the selection can be based on utilizing the radio measurement locating process (corresponding to a position estimation mode) which may be available in the particular location. In another embodiment, the selection can be based on utilizing the radio measurement locating process (corresponding to a position estimation mode) that corresponds to process(es) previously used by the mobile device (and/or other mobile device(s) such as similar mobile device(s)) in the same or similar location. Other factors can be utilized in the selection of the radio measurement locating process to be employed (corresponding to a position estimation mode) including obtaining multiple location estimates by different processes, which in some embodiments can be compared or otherwise analyzed such as for accuracy.

System 700 illustrates several different radio measurement locating processes including proximity, 0D, 1D, 2D, and 3D processes. In the embodiment illustrated in FIG. 12, the selectable processes are based on the results that can be obtained for the position information, such as confirming the mobile device is within a particular region (e.g., anchor coverage area) around the anchor based on a proximity process (without determining a distance between the mobile device and the anchor); determining the mobile device is a particular distance away from the anchor based on a 0D process (with or without determining a direction between the mobile device and the anchor—as an example angle of arrival may or may not be utilized to facilitate determining the direction between the tag and the anchor); determining the mobile device is at one of a number of positions based on a 1D process (e.g., along a hyperbolic curve that is determined based on a pair of anchors); determining the mobile device is at a position based on a 2D process (e.g., in an X, Y coordinate system that is determined based on pairs of anchors); and determining the mobile device is at a position based on a 3D process (e.g., in an X, Y, Z coordinate system that is determined based on pairs of anchors and/or sensors that help determine the height of mobile device including (but not limited to) barometer, etc.). In other embodiments, the selectable processes can be based on the type of radio measurements being employed and/or the results that can be obtained for the position information, such as a downlink TDOA or downlink TW-TOA as radio measurement locating processes for determining mobile device locations within a demarcated area. The selectable different radio measurement locating processes can be any number of processes, including different processes to reach the same result (e.g., two different types of 2D processes that can be selected) or different processes to reach different results (e.g., a 2D result and a 3D result). The selectable different radio measurement locating processes can include any of the processes described herein with respect to other embodiments (including with respect to FIGS. 1-11), as well as other types of radio measurement locating processes (including positioning according to other types of coordinate systems).

Figure 13:
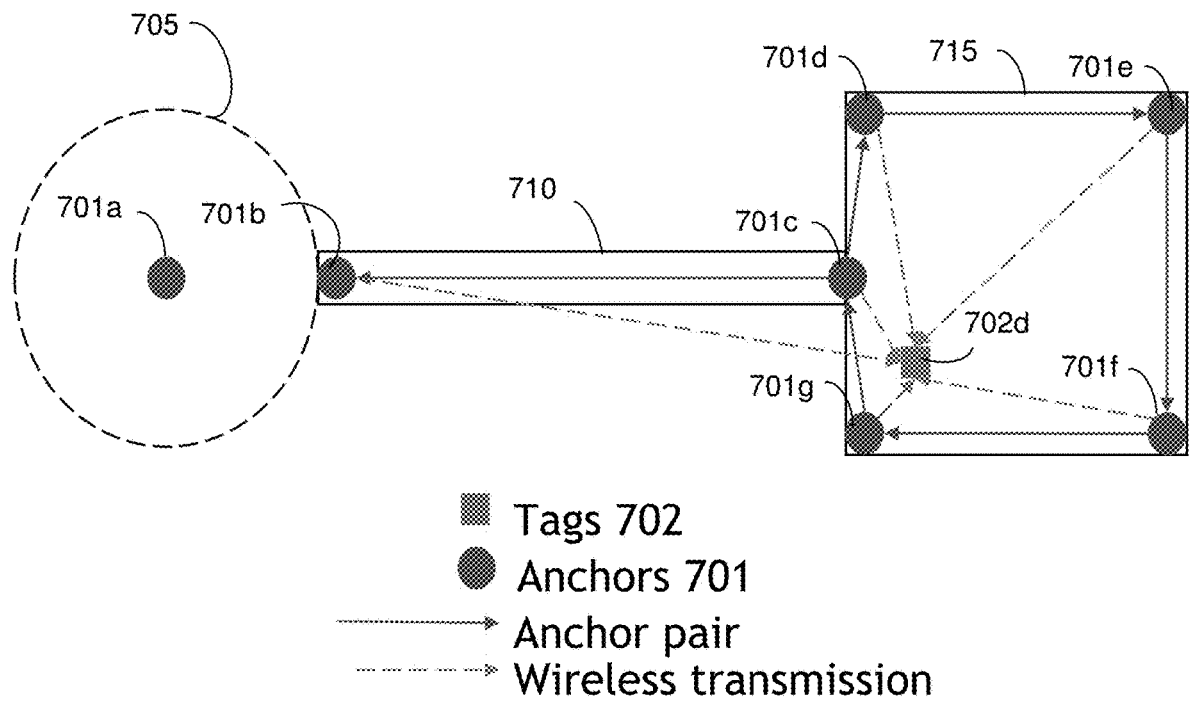

FIG. 13 is a block diagram of a portion 800 of the system 700 of FIG. 12 illustrating an exemplary, non-limiting embodiment of the mobile device 702*d* and stationary anchors 701 (labeled a-g) for selecting a particular radio measurement locating process from among a group of processes and for determining location information for the mobile device 702*d* based on range measurements associated with some of the stationary anchors 701 in accordance with various aspects described herein. System 700 shows areas 705, 710, 715 of a demarcated area, although any number of areas and/or anchors in various configurations and layouts can be utilized, such as shown in FIG. 7, for enabling position or location estimation for any number of mobile devices.

In this example, the mobile device 702*d* receives wireless transmissions from each of anchors 701*b-g* but does not receive (or otherwise cannot "hear" such as not receiving the signal or the particular received signal is below a threshold strength) a wireless transmission from anchor 701*a*. The selection information included in the received wireless messages enables the mobile device 702*d* to determine the "existence" of anchor pairs 701*c-b*, 701*c-d*, 701*d-e*, 701*f-g*, and 701*g-c*. In this example, the "existence" means that the mobile device 702*d* can obtain range measurements associated with each of those particular anchor pairs so that position location estimation can be performed. In this example, the existence of multiple pairs of anchors causes the mobile device 702*d* to select a 2D position estimation mode which has a corresponding 2D position location process for determining that the mobile device is at a particular position (e.g., in an X, Y coordinate system). Further to this example, the existence of more than a particular number of pairs of anchors would have enabled the mobile device 702*d* to select a 3D position estimation mode which has a corresponding 3D position location process for determining that the mobile device is at a particular position (e.g., in an X, Y, Z coordinate system). In this embodiment, the selection and use of the 2D position location process within the room or warehouse 715 (rather than utilizing a 1D process, 0D process or a proximity process) enables a more accurate position estimation for the mobile device. In one embodiment, selection information received which indicates the existence of a threshold number of anchor pairs (e.g., three or more of anchor pairs 701*c-d*, 701*d-e*, 701*e-f*, 701*f-g*, and 701*g-c*) enables the mobile device 702*d* to determine that it is in area 715 and that a 2D process can be utilized for position determination.

Figure 14:
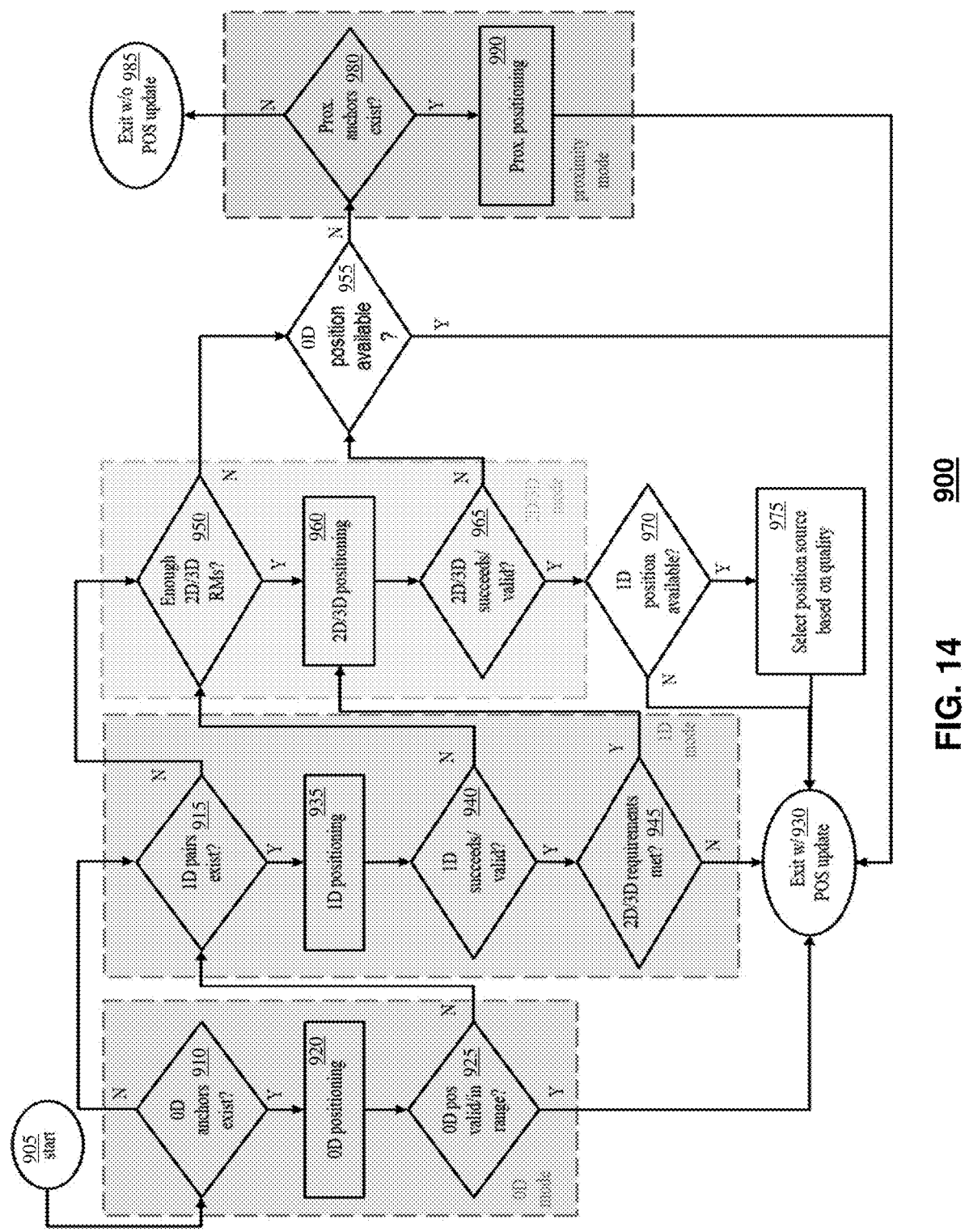
FIG. 14 depicts an illustrative embodiment of a method for selecting modes and determining location information and uses thereof in accordance with various aspects described herein.

FIG. 14 depicts an illustrative embodiment of a method 900 in accordance with various aspects described herein. Method 900 can employ location determination(s) that is based on radio measurements (e.g., TDOA, TOA, and so forth) and can enable a selection as to which location process(es) among a group of processes is to be employed (e.g., a selection made by a position estimation engine or component). The method 900 can be performed by various devices (or combinations of devices) including anchors, mobile devices, servers, and so forth.

In one embodiment, the position engine is located in the mobile device whose location is being determined or otherwise estimated. In this example, method 900 is described as being performed by the position estimation engine which starts at 905. Information can be received by the position engine (e.g., broadcast selection information from the anchor(s)) which can be analyzed via method 900 in order to select one or more position estimation modes to be implemented. The selection information can include various information including location service broadcast information, anchor's ID, anchor's location, anchor pair information, anchor's capabilities, and so forth. Messages received by the mobile device can further include ranging information, range or validity thresholds, and so forth.

At 910, a determination can be made as to the existence of anchors based on selection information that is broadcast by the anchor(s), such as are there one or more anchors available which have the capability so that a 0D process can be performed by the mobile device. For example, this determination can be made based on which anchor messages were received and/or the ID of those anchors.

If it is determined at 910 that there are no such 0D anchors available then method 900 proceeds to 915 where a determination, based on received selection information, can be made as to the existence of anchor pairs, such as are there one or more anchor pairs available which have the capability so that a 1D process can be performed by the mobile device. For example, this determination can be made based on which anchor messages were received, the ID of those anchors, and/or identification as to anchor pairs.

If on the other hand it is determined at 910 that 0D anchors are available, then method 900 proceeds to 920 where a 0D process can be implemented. As an example, the 0D process can include the mobile device, via the position engine, performing range measurement to the heard 0D anchor and determining its distance from that anchor. The 0D process can utilize various techniques described herein which can be based on range measurements associated with messaging from the 0D anchor (e.g., which can be a message that included selection information and/or can be a separate message). At 925, the results of the 0D process can be evaluated for validity and range requirements. For example, a validity or range threshold (e.g., included with the selection information, obtained in another message from the 0D anchor or from another source, and/or provisioned to and stored in a memory of the mobile device) can be applied to the 0D position calculation. In this example, a 0D calculated distance which is below the threshold can indicate that the mobile device is within an area that has been assigned 0D position estimation mode (e.g., area 705 of FIG. 12) and thus the results of the 0D process are valid. However, in this example, a 0D calculated distance which is above the threshold can indicate that the mobile device is outside of the area that has been assigned 0D position estimation mode, such as the mobile device being located in area 710 and thus the results of the 0D process are invalid.

If it is determined at 925 that the results of the 0D process are deemed valid and satisfy the range requirement then method 900 can proceed to 930 where a position update can be established or performed based on the 0D results. In one embodiment, the position update can be reported to one or more other devices to enable position monitoring for mobile devices within a demarcated area. In another embodiment, the position update can be analyzed for notification purposes such as sending warning notices or an alarm based on positions of different objects being within a threshold distance of each other. The position update can be utilized for various other purposes by the mobile device and/or by other devices monitoring the position of the mobile device, including tracking positions of a mobile device for generating historical data. If on the other hand it is determined at 925 that the results of the 0D process are deemed invalid or do not satisfy a range requirement then method 900 can proceed to 915 where the determination is made, based on the selection information, as to the existence of anchor pairs which have the capability so that the 1D process can be performed by the mobile device.

At 915, if it is determined there are no such 1D anchor pairs available then method 900 proceeds to 950 where a determination can be made, based on the selection information, as to the existence of a requisite number of anchor pairs, such as are there enough anchor pairs (and/or range measurements) available which have the capability so that a 2D and/or 3D process can be performed by the mobile device.

If on the other hand it is determined at 915 that 1D anchor pairs are available, then method 900 can proceed to 935 where a 1D process can be implemented. As an example, the 1D process can include the mobile device, via the position engine, performing range measurement to at least one anchor pair and determining its general location in that area. The 1D process can utilize various techniques described herein which can be based on range measurements associated with messaging from the 1D anchor pairs (e.g., a message(s) that included selection information and/or a separate message(s)). For example, the range measurements can be analyzed to identify a general location such as a group or range of locations along a hyperbolic curve between the anchor pair. In another embodiment, since the bounds of the area can be known, the range of locations can be limited, such as the locations along the hyperbolic curve that is limited by the two walls that form the hallway of area 710.

At 940, the results of the 1D process can be evaluated for success (e.g., was the mobile device capable of determining results from the obtained data and range measurements), validity and range requirements. For example, a validity or range threshold (e.g., included with the selection information, obtained in another message from the 1D anchor pairs or from another source, and/or provisioned to and stored in a memory of the mobile device) can be applied to the 1D position calculation. In this example, a 1D calculated distance which does satisfy the threshold can indicate that the mobile device is within an area that has been assigned 1D position estimation mode (e.g., area 710 of FIG. 12) and thus the results of the 1D process are valid. However, in this example, a 1D calculated distance which is outside of or otherwise does not satisfy the threshold can indicate that the mobile device is outside of the area that has been assigned 1D position estimation mode, such as the mobile device being located in an area other than area 710 (or being located very near the ends of the hallway 710) and thus the results of the 1D process are invalid.

If at 940 it is determined that the results of the 1D process are deemed invalid or do not satisfy a range criteria or threshold then method 900 can proceed to 950 for the determination, based on selection information, as to whether there are enough anchor pairs (and/or range measurements) available for a 2D and/or 3D process to be performed by the mobile device. For example, this determination can be made based on which anchor messages were received, the ID of those anchors, the number of anchor pairs, the number of range measurements available, and/or identification as to anchor pairs.

If on the other hand it is determined at 940 that the results of the 1D process are deemed valid or satisfy the range requirements then method 900 can proceed to 945 where a determination can be made as to whether process requirements have been met. For example, the determination can be based on detecting enough anchor pairs (and/or range measurements) available for the 2D and/or 3D process to be performed by the mobile device. In one embodiment, this can be based on which anchor messages were received, the ID of those anchors, the number of anchor pairs, the number of range measurements available, and/or identification as to anchor pairs.

If at 945 it is determined that the 2D and/or 3D requirements have not been met then method 900 can proceed to 930 where the position update can be established based on the 1D results. In one embodiment, a notification can be emitted or presented by the mobile device and/or transmitted (e.g., to a server and/or one or more anchors) indicating the position update. If on the other hand it is determined at 945 that the 2D and/or 3D requirements have been met then method 900 can proceed to 960 where a 2D and/or 3D process is performed by the mobile device. As an example, the 2D and/or 3D process can include the mobile device, via the position engine, performing range measurement to anchor pairs and determining a real-time position in the area. The 2D and/or 3D process can utilize various techniques described herein which can be based on range measurements associated with messaging from the anchor pairs (e.g., messages that included selection information and/or separate messages). For example, the range measurements can be analyzed to identify X, Y and/or X, Y, Z coordinates for the mobile device, such as based on an intersection of hyperbolic curves between anchor pairs.

At 950, if it is determined that there are not enough anchor pairs (and/or range measurements) available for a 2D and/or 3D process to be performed by the mobile device then method 900 can proceed to 955 where a determination, based on the selection information, can be made as to whether a 0D position calculation (step 920) was performed.

If at 955 it is determined that a 0D position calculation (step 920) was performed then method 900 can proceed to 930 where the position update can be established based on the 0D results. In one embodiment, a notification can be emitted or presented by the mobile device and/or transmitted (e.g., to a server and/or one or more anchors) indicating the position update. If on the other hand it is determined at 955 that a 0D position calculation (step 920) was not performed then method 900 can proceed to 980 where a determination, based on the selection information, can be made as to the existence of proximity anchors, such as are there one or more anchors available which have the capability so that a proximity process can be performed by the mobile device. For example, this determination can be made based on which anchor messages were received and/or the ID of those anchors. If it is determined at 980 that there are no such proximity anchors available then at 985 there is no position update done. In one embodiment, a notification can be emitted or presented by the mobile device and/or transmitted (e.g., to a server and/or one or more anchors) indicating that no position update is available.

If on the other hand it is determined at 980 that there are proximity anchors available then method 900 can proceed to 990 where a proximity process can be performed by the mobile device and to 930 where the position update can be established based on the proximity results. As an example, the mobile device can perform a rough estimate of its location based on heard proximity anchors, without performing accurate range measurements. For instance, the proximity results can indicate that the mobile device is located within the area 705 (of FIG. 12) without indicating how far from the anchor. In one embodiment, a notification can be emitted or presented by the mobile device and/or transmitted (e.g., to a server and/or one or more anchors) indicating the position update.

If on the other hand at 950 it is determined that there are enough anchor pairs (and/or range measurements) available for a 2D and/or 3D process to be performed by the mobile device then method 900 can proceed to 960 where 2D and/or 3D process is performed by the mobile device. At 965 if it is determined that the results of the 2D and/or 3D process are deemed unsuccessful (e.g., the mobile device was not capable of determining results from the obtained data and range measurements), invalid or do not satisfy range requirements then method 900 can proceed to 955 for the determination as to whether a 0D position calculation (step 920) was performed. In one embodiment at 965, a validity or range threshold (e.g., included with the selection information, obtained in another message from the anchor pairs or from another source, and/or provisioned to and stored in a memory of the mobile device) can be applied to the 2D and/or 3D position calculation. In this example, a calculated position and/or distance which satisfies the threshold can indicate that the mobile device is within an area that has been assigned 2D and/or 3D position estimation mode (e.g., area 715, 720 of FIG. 12) and thus the results of the 2D and/or 3D process are valid. However, in this example, a 2D and/or 3D calculated position and/or distance which is outside of or otherwise does not satisfy the threshold can indicate that the mobile device is outside of the area that has been assigned 2D and/or 3D position estimation mode, such as the mobile device being located in an area other than area 715, 720 and thus the results of the 2D and/or 3D process are invalid.

If on the other hand at 965 it is determined that the results of the 2D and/or 3D process are deemed successful, valid or satisfy range requirements then method 900 can proceed to 970 for the determination as to whether a 1D position calculation (step 935) was performed. If at 970 it is determined that a 1D position calculation (step 935) was not performed then method 900 can proceed to 930 where the position update can be established based on the 2D and/or 3D results.

If on the other hand at 970 it is determined that a 1D position calculation (step 935) was performed then method 900 can proceed to 975 to select a position source (e.g., based on quality of results, a figure of merit analysis, historical data including prior selections, and so forth) and to 930 where the position update can be established based on the selected one of the 1D or 2D and/or 3D results. In one embodiment, a notification can be emitted or presented by the mobile device and/or transmitted (e.g., to a server and/or one or more anchors) indicating the position update.

While for purposes of simplicity of explanation, the respective processes are shown and described as a series of blocks in FIG. 14, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 985, 990 can be optional.

Figure 15:
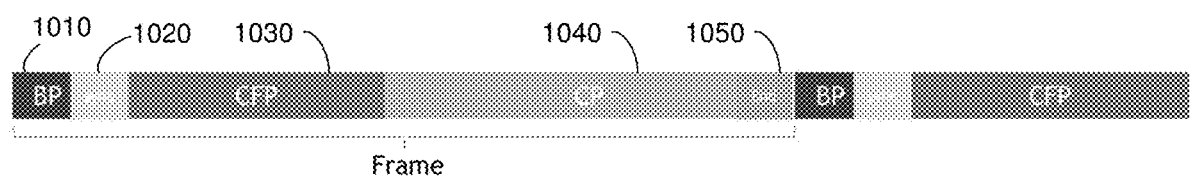
FIG. 15 depicts an illustrative embodiment of a frame structure for communications in a system that facilitates for selecting modes and determining location information in accordance with various aspects described herein.

FIG. 15 depicts an illustrative embodiment of a frame structure 1000 that can be utilized in wireless communications in accordance with various aspects described herein. In one embodiment, messages received by a mobile device or tag are transmitted during contention-free period (CFP) 1030 and/or contention period (CP) 1040 in every super frame period. For example, broadcast messages from anchors that include selection information can be broadcast during the CFP, although other frame periods can also be utilized in other embodiments. In one embodiment, a beacon period 1010 is utilized for beacon signals for synchronizing anchor nodes. In one embodiment, the CFP can be utilized for DL-TDOA ranging packets. In one embodiment, the CP can be utilized for UL-TDOA and/or TW-TOA ranging packets and additional data packets/control signaling packets. In one embodiment, sync 1020 is a short buffer period for anchors to synchronize the start of the CFP to each other. In one embodiment, end 1050 is a short buffer period for next frame preparation, guard interval for ACK message transmission, and so forth. Various other scheduling and timing, including use of particular frame structures can be used with the exemplary embodiments and are described in U.S. Pat. No. 10,779,118 filed Jan. 11, 2019 to Duan et al., the disclosure of which is hereby incorporated by reference herein.

The exemplary embodiments described herein can utilize various radio or range measurement locating processes and devices including one or more (or a portion thereof) of the processes and/or devices described with respect to U.S. Pat. No. 10,408,917 filed Jan. 11, 2019; U.S. Pat. No. 10,444,321 filed Dec. 31, 2014; and U.S. Patent Application Publication 2015/0156746 filed Dec. 3, 2014, the disclosures of all of which are incorporated by reference herein in their entirety. These described radio or range measurement locating processes and devices (or functions or components thereof) can be utilized (in whole or in part) in conjunction with one or more of the embodiments described herein and/or in place of one or more functions or components described with respect to the one or more of the embodiments.

In one or more embodiments, the position engine described herein can be utilized in conjunction with embodiments for mapping demarcated areas described in U.S. patent application Ser. No. 16/937,807 filed Jul. 24, 2020, the disclosure of which is hereby incorporated by reference herein in its entirety. As an example, an area can be mapped as to which position estimation mode(s) should be utilized in what particular sub-areas, such as the hallway vs the office room. In one embodiment, the mapping process can be based on the mapping performed in U.S. patent application Ser. No. 16/937,807 where position estimation mode(s) are further stored (or stored in place of RF characteristics). In one embodiment, the position estimating processes can be based on techniques (e.g., uplink TDOA or an uplink TW-TOA as radio measurement locating processes) described in U.S. patent application Ser. No. 16/937,807. In one embodiment, the mapping can be a model generated from machine learning according to observed characteristics (e.g., received selection information resulting in particular position estimation mode selections) that is used with or without observed RF characteristics of RF channels for various mobile devices or objects at various positions (or various zones) within the particular area. In one or more embodiments, when a sufficient number of labeled data samples are collected, they can form a training set to train a machine learning model which can learn the position estimation mode and/or RF fingerprint or signature of the environment from the data. The trained model can be utilized to identify a position estimation mode to be utilized in a particular sub-area and/or a position or zone when RF characteristics for communications associated with a mobile device or object in the demarcated area are received. In one or more embodiments, the trained model can be used to generate new position estimation mode selections and/or new positions when new RF data is available. In one or more embodiments, the trained model can be used to improve position accuracy determinations, such as by allowing for a comparison of position determinations from different radio measurement techniques (e.g., which position estimation mode was most accurate or satisfied a particular criterion), as well as a comparison to position determinations from RF fingerprint information in the model.

Figure 16:
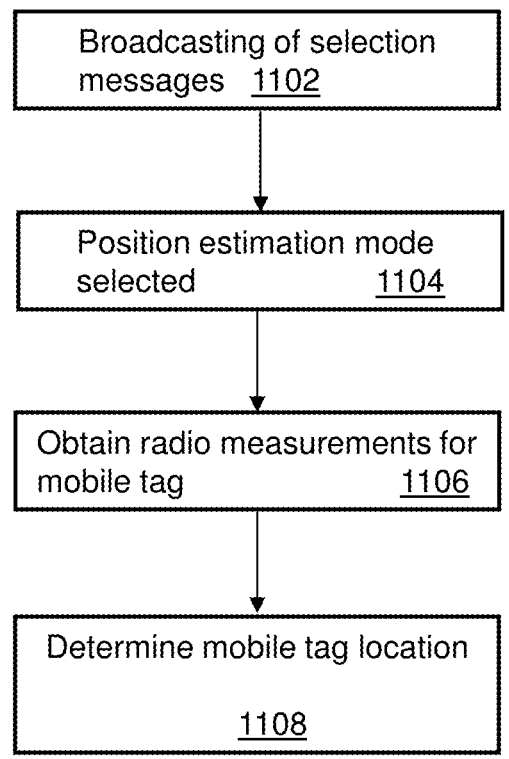
FIG. 16 depicts an illustrative embodiment of a method for selecting modes and determining location information and uses thereof in accordance with various aspects described herein.

FIG. 16 depicts an illustrative embodiment of a method 1100 in accordance with various aspects described herein. Method 1100 can employ location determination that is based on radio measurements (e.g., TDOA, TOA, and so forth) and can enable a position estimation engine or component to select which location process(es) among a group of processes is to be employed. The method 1100 can be performed by various devices (or combinations of devices) including anchors, mobile devices, servers, and so forth. In one embodiment, the position engine is located in the mobile device whose location is being determined or otherwise estimated.

At 1102, one or more messages can be wirelessly transmitted (e.g., via broadcasting), from one or more anchors. In one embodiment, the messages can be broadcast according to a schedule. In another embodiment, the messages can be broadcast during a particular portion of a frame, such as during a contention-free period. Other techniques can also be utilized for providing selection information (e.g., included in selection messages) to a device (e.g., the mobile device(s)) so that selection of a position estimation mode(s) can be performed. In one embodiment, the selection information, broadcast by a particular anchor, can include anchor information (e.g., anchor ID, anchor location, anchor pair information, and so forth) associated with the particular anchor. This broadcasting of the corresponding information can also be performed by any, some or all of the anchors (e.g., according to a schedule). In another embodiment, the selection information can include other data, such as Location Service Broadcast (LSB) information and/or ranging information.

At 1104, a selection can be performed, according to the selection information, of a particular position estimation mode from among a group of position estimation modes that are each associated with a different radio measurement locating process. For example, the selection can be based on detecting the most accurate available position estimation mode (e.g., determining which anchor pairs are available for radio measurements). In another embodiment, the particular position estimation mode can be based on estimating a current position within a sub-area of the demarcated area, such as utilizing an assigned mode for that sub-area (e.g., a proximity or 0D process in open space, a 1D process in a hallway, and a 2D and/or 3D process in a room or warehouse). The selection can also be based on availability of devices and functions, such as whether a threshold number of anchors and/or anchor pairs is available and/or whether a particular location process can be performed with those available anchors and/or anchor pairs. The selection can be based on various information in conjunction with the selection information, such as one or more previously selected position estimation modes of the mobile device and/or one or more previously determined positions for the mobile device. In one embodiment, the mobile device can store historical information such as previously selected position estimation modes of the mobile device, previously received information from anchor(s)/anchor pairs and/or previously determined positions for the mobile device. In another embodiment, the position estimation engine can access a storage device (e.g., at a server(s) and/or at an anchor(s)) to obtain historical information such as previously selected position estimation modes of the mobile device, previously received information from anchor(s)/anchor pairs and/or previously determined positions for the mobile device.

At 1106, one or more radio measurements can be obtained by the position estimation engine (e.g., operating in the mobile device) from at least one of the one or more anchors. In one embodiment, the number of radio measurements obtained from the number of different anchors can be indicative of the position estimation mode that is selected or to be selected. For example, if only first range measurements for a first pair of anchors is obtained then the position estimation mode selected may be a 1D process, while if range measurements are obtained for multiple pairs of anchors then the position estimation mode selected may be a 2D or 3D process. The radio or range measurements can be obtained from various messages, such as the R-REQ and/or R-RSP messages described herein (or REQ and RSP messages described in the TDOA or TOA processes in U.S. patent application Ser. No. 16/937,807). In one embodiment, the radio or range measurements can be obtained, in whole or in part, from messages that are different than the messages which included the selection information. In one embodiment, the radio or range measurements can, in whole or in part, be obtained from the broadcast messages that included the selection information.

At 1108, position information can be determined for the mobile device based on the one or more radio measurements by applying a particular radio measurement locating process(es) of the particular position estimation mode(s). As an example, this can be: a single position estimation that is determined from a single particular radio measurement locating process of a single particular position estimation mode; multiple position estimations that are determined from multiple radio measurement locating processes of a single particular position estimation mode; or multiple position estimations that are determined from multiple radio measurement locating processes of multiple position estimation modes. In one embodiment, where multiple position estimations are made, they can be compared for accuracy and/or other accuracy analysis can be implemented including a figure of merit analysis or other techniques. In another embodiment, where a single position estimation is made, accuracy can be analyzed, such as using a figure of merit analysis or other techniques. In one embodiment, accuracy analysis can be based on comparing all current or available measurements techniques and/or comparing to past measurements.

While for purposes of simplicity of explanation, the respective processes are shown and described as a series of blocks in FIG. 16, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one embodiment, a proximity mode for the position engine can include a mobile device performing a rough estimate of its location based on the heard proximity anchors, without performing accurate range measurement.

In one embodiment, a 0D mode for the position engine can include a mobile device performing range measurement to the heard 0D anchor and determining if it is within a certain distance to that anchor. In one embodiment, a 1D mode for the position engine can be activated in narrow areas (e.g., an aisle or hallway) where 1D anchor pairs are deployed and where the mobile device performs range measurements to 1D anchor pairs and obtains the knowledge as to where it is located in the area. In one embodiment, a 2D and/or 3D mode for the position engine can be activated in relatively open space or larger areas where the mobile device performs range measurements to 2D/3D anchor pairs and calculates its real-time location based on the range measurements.

In one or more embodiments, information indicating the existence of 0D anchors, 1D anchor pairs, 2D/3D anchors for range measurements and prox. anchors can be embedded in received messages and/or can otherwise be determined from selection information in the received messages.

In one embodiment, a selection can be made as to the most appropriate position estimation mode(s) for best performance Use cases in a demarcated area can be transitioning, such as based on mobile devices moving from sub-area to sub-area.

In one embodiment, a 0D process enables a mobile device to know it is in coverage area of an anchor and to know a distance to the anchor according to UWB measurements to calculate the distance to anchor.

In one embodiment, a proximity process enables a mobile device to hear an anchor (e.g., know it is in a general area such as near an anchor/within its coverage area) but the mobile device does not know the distance to anchor (e.g., there is no UWB measurements available). In one embodiment, the proximity process mode can have the lowest priority. In one embodiment, a proximity process may not be implemented where 1D tracking is available.

In one embodiment, the position estimation engine can perform various techniques to detect false positives. For example, historical data (such as previous location of tag, previous mode selections) can be analyzed. In one embodiment, signal strengths can be utilized for detecting false positives, such as discarding messages below a particular threshold and/or utilizing the RF mapping described in U.S. patent application Ser. No. 16/937,807.

In one embodiment, a best position estimation mode at a current location of the mobile device can be selected. In another embodiment, a path can be predicted for the mobile device to select future best position estimation mode for a future location of the mobile device.

In one embodiment, the network, such as via one or more anchors, announces availability information when broadcasting while the mobile devices can make decisions as to particular location processes to be executed based on what the mobile device hears.

In one embodiment, the position engine can access a storage device (such as in the mobile device) to facilitate making position estimation mode decisions, such as previous modes, history of selections, history of positions, lookup table related to anchors, anchor positions, anchor IDs, and so forth. In one embodiment, RSSI data can be utilized in the location determination process. In one embodiment, when the mobile device is moving in an area assigned a particular locating process towards another area assigned a different locating process but is unable to hear (or otherwise obtain necessary information therefrom) a particular anchor(s) then the mobile device can choose a sub-optimal process. In another embodiment, multiple location processes can be selected and employed, such as if accuracies of one of the results is within a particular threshold.

In one embodiment, user behavior and/or expected behavior can be analyzed. For example, a comparison of a user's expected location with a determined location can be performed in determining validity and accuracy. For instance, a personnel tag for a driver indicating a location in an office may be indicative of an inaccurate determination. In one embodiment, various data indicative of user behavior such as a user calendar, can also be analyzed as part of the validity and accuracy determination.

In one embodiment it may be determined that the 2D/3D process is not preferred under particular circumstances, and an accurate and valid 1D (or 0D or proximity) process can be selected over implementing the 2D/3D process.

In one or more embodiments described herein, the position engine is located in the mobile device whose location is being determined or otherwise estimated, however, the position engine (which selects the particular mode and determines the location of the mobile device) can be located in devices other than the mobile device, such as in one or more of the anchors and/or a server(s) (e.g., in communication with one or more of the anchors and/or in communication with the mobile device). In one embodiment position engines can be located in various devices including mobile devices, anchors, and/or servers.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
generating a plurality of messages that each includes selection information comprising anchor information associated with a corresponding one of a plurality of anchors; and
wirelessly broadcasting, by the plurality of anchors, the plurality of messages, wherein the selection information enables a mobile device to select a particular position estimation mode from among a group of position estimation modes, wherein the group of position estimation modes includes first and second estimation modes, wherein the first estimation mode is based on first range measurements for a single pair of anchors of the plurality of anchors, wherein the second estimation mode is based on a plurality of range measurements for multiple pairs of anchors of the plurality of anchors, wherein each of the first estimation mode and the second estimation mode is assigned to a respective type of area of multiple types of areas within a demarcated area, wherein the multiple types of areas include a hallway, an aisle, or a tunnel, wherein the first estimation mode is assigned to the hallway, the aisle, or the tunnel, wherein the multiple types of areas further include a room, an office, a factory area, a warehouse, a parking lot, a stadium, a bridge, an airport terminal, or an open space, wherein the second estimation mode is assigned to the room, the office, the factory area, the warehouse, the parking lot, the stadium, the bridge, the airport terminal, or the open space, wherein selecting the particular position estimation mode involves determining an estimated current position of the mobile device based on the selection information and identifying a type of area of the multiple types of areas that corresponds to the estimated current position, and wherein one or more radio measurements obtained by the mobile device enable the mobile device to apply a particular radio measurement locating process of the particular position estimation mode to determine position information of the mobile device based on the one or more radio measurements.

2. The method of claim 1, comprising:
wirelessly transmitting, by one or more of the plurality of anchors, one or more measurement messages that include the one or more radio measurements.

3. The method of claim 1, wherein the particular position estimation mode selected by the mobile device is the first estimation mode, and wherein the position information is represented along a hyperbolic curve.

4. The method of claim 1, wherein the particular position estimation mode selected by the mobile device is the second estimation mode, and wherein the position information is represented in one of a two dimensional coordinate system or a three dimensional coordinate system.

5. The method of claim 1, wherein the group of position estimation modes includes a third estimation mode that is based on a range measurement of a single anchor of the plurality of anchors, and wherein the position information determined by the third estimation mode includes a distance from the single anchor.

6. The method of claim 1, wherein the group of position estimation modes includes a fourth estimation mode that is based on determining that the mobile device is within a coverage range of a single anchor of the plurality of anchors.

7. The method of claim 1, wherein the selection information identifies anchor pairs for the plurality of anchors.

8. The method of claim 1, wherein the particular position estimation mode is selected by the mobile device based in part on a previous position estimation mode of the mobile device, previous position information determined for the mobile device, previous information received by the mobile device from one or more of the plurality of anchors, or a combination thereof.

9. The method of claim 1, wherein the mobile device applies a second radio measurement locating process of another position estimation mode to determine second position information of the mobile device, wherein the position information and the second position information are compared for accuracy.

10. A non-transitory machine-readable medium comprising executable instructions that, when executed by a processing system of a mobile device, facilitate performance of operations, the operations comprising:

wirelessly receiving, from one or more anchors, one or more messages that each includes selection information comprising anchor information associated with a corresponding one of the one or more anchors;

selecting, according to the selection information, a particular position estimation mode from among a group of position estimation modes that are each associated with a different radio measurement locating process, wherein the group of position estimation modes includes a first estimation mode that is assigned to a first type of area of multiple types of areas within a demarcated area and a second estimation mode that is assigned to a second type of area of the multiple types of areas, wherein the first type of area comprises a hallway, an aisle, or a tunnel, wherein the second type of area comprises a room, an office, a factory area, a warehouse, a parking lot, a stadium, a bridge, an airport terminal, or an open space, and wherein the selecting the particular position estimation mode involves determining an estimated current position of the mobile device based on the selection information and identifying a type of area of the multiple types of areas that corresponds to the estimated current position;

obtaining, from at least one of the one or more anchors, one or more radio measurements; and determining position information of the mobile device based on the one or more radio measurements by applying a particular radio measurement locating process of the particular position estimation mode.

11. The non-transitory machine-readable medium of claim 10, wherein the obtaining the one or more radio measurements comprises wirelessly receiving, from the at least one of the one or more anchors, one or more measurement messages that include the one or more radio measurements.

12. The non-transitory machine-readable medium of claim 10, wherein the first estimation mode is based on first range measurements for a single pair of anchors of the one or more anchors.

13. The non-transitory machine-readable medium of claim 10, wherein the second estimation mode is based on a plurality of range measurements for multiple pairs of anchors of the one or more anchors.

14. The non-transitory machine-readable medium of claim 10, wherein the group of position estimation modes includes a third estimation mode based on a range measurement of a single anchor of the one or more anchors, and wherein the position information determined by the third estimation mode includes a distance from the single anchor.

15. The non-transitory machine-readable medium of claim 10, wherein the group of position estimation modes includes a fourth estimation mode based on determining that the mobile device is within a coverage range of a single anchor of the one or more anchors.

16. The non-transitory machine-readable medium of claim 10, wherein the selection information identifies anchor pairs for the one or more anchors, and wherein the selecting the particular position estimation mode is based in part on a previous position estimation mode of the mobile device.

17. The non-transitory machine-readable medium of claim 10, wherein the selecting the particular position estimation mode is based in part on previous position information determined for the mobile device, previous information received by the mobile device from at least one of the one or more anchors, or a combination thereof.

18. A system, comprising:
a plurality of anchors that are configured to perform operations comprising:
obtaining a plurality of messages that each includes selection information comprising anchor information associated with a corresponding one of the plurality of anchors; and
wirelessly broadcasting the plurality of messages, wherein the selection information enables a mobile device to select a particular position estimation mode from among a group of position estimation modes, wherein the group of position estimation modes includes first and second estimation modes, wherein the first estimation mode is based on first range measurements for a single pair of anchors of the plurality of anchors, wherein the second estimation mode is based on a plurality of range measurements for multiple pairs of anchors of the plurality of anchors, wherein a machine learning process is utilized to generate a mapping for position estimation modes to be utilized in particular types of areas of multiple types of areas within a demarcated area, wherein the multiple types of areas include a hallway, an aisle, or a tunnel, wherein the first estimation mode is mapped to the hallway, the aisle, or the tunnel, wherein the multiple types of areas further include a room, an office, a factory area, a warehouse, a parking lot, a stadium, a bridge, an airport terminal, or an open space, wherein the second estimation mode is mapped to the room, the office, the factory area, the warehouse, the parking lot, the stadium, the bridge, the airport terminal, or the open space, wherein selecting the particular position estimation mode involves determining an estimated current position of the mobile device based on the selection information and identifying a type of area of the multiple types of areas that corresponds to the estimated current position, and wherein one or more radio measurements obtained by the mobile device enable the mobile device to apply a particular radio measurement locating process of the particular position estimation mode to determine position information of the mobile device based on the one or more radio measurements.

19. The system of claim 18, wherein the obtaining the plurality of messages comprises generating the plurality of messages, wherein the group of position estimation modes includes a third estimation mode that is based on a range measurement of a single anchor of the plurality of anchors, wherein the position information determined by the third estimation mode includes a distance from the single anchor, wherein the group of position estimation modes includes a fourth estimation mode that is based on determining that the mobile device is within a coverage range of a single anchor of the plurality of anchors, and wherein the selection information identifies anchor pairs for the plurality of anchors.

20. The system of claim 18, wherein the machine learning process is applied to messages that are wirelessly transmitted as part of the particular radio measurement locating process.

* * * * *